United States Patent [19]
Walters

[11] 3,755,658
[45] Aug. 28, 1973

[54] ANALOG COMPUTER FOR PROCESSING DELTA ROSETTE STRAIN GAGE DATA

[76] Inventor: Robert M. Walters, 17 Princeton Rd., Burlington, Mass. 01803

[22] Filed: June 2, 1972

[21] Appl. No.: 259,069

[52] U.S. Cl....... 235/151.3, 33/DIG. 13, 73/88.5 R, 73/89, 235/185, 235/186
[51] Int. Cl. .......................... G06g 7/48, G06g 7/22
[58] Field of Search................ 33/DIG. 13; 73/88 R, 73/88.5 R, 88.5 SD, 89; 235/151.3, 185, 186; 338/2, 6

[56] References Cited
UNITED STATES PATENTS
2,478,720  8/1949  Sourwine et al. ................ 73/88.5 R
3,474,237  10/1969  Hastings........................... 235/151.3

*Primary Examiner*—Charles E. Atkinson
*Assistant Examiner*—R. Stephen Dildine, Jr.
*Attorney*—R. S. Sciascia and L. I. Shrago

[57] ABSTRACT

An analog computer which determines the state of stress at a point on the surface of a body from data produced by a standard three-gage delta rosette. The computer solves this problem by use of an analog of Mohr circles rather than by direct solution of the rosette equations. Its circuit includes a circular potentiometer with two rotatable output contacts 90° apart which is interconnected at preselected points to a resistance triangle whose vertices correspond to those of the delta rosette. The normal and associated shear stress are available at these contacts when taken with respect to appropriate potential levels. Provision is included for changing one of these levels so that the computer may be utilized with materials having different Poisson's ratios.

15 Claims, 5 Drawing Figures

ANALOG COMPUTER FOR PROCESSING DELTA ROSETTE STRAIN GAGE DATA

The invention described herein may be manufactured and used by or for The Government of the United States of America for governmental purposes without the payment of any royalties thereon or therefor.

The present invention relates generally to apparatus for and methods of determining the state of stress at a point on the surface of a body and, more particularly, to a simple analog computer which solves this problem with strain gage measurements obtained from the standard three-gage delta rosette.

The state of stress at a point on the surface of a body may, for example, be determined from the values of the two principal stresses in the surface and the direction of either one with respect to an arbitrary reference line. More generally, however, the values of the normal stresses or the normal strains in any three specified directions will yield this stress condition. Thus, in the general biaxial stress case, at least three strain gages are required to ascertain the state of stress at a particular point.

When strain gage data is utilized in this regard, a knowledge of the modulus of elasticity and of Poisson's ratio for the material being investigated is also required.

The conversion of strain gage data to stress information is simplified if the relative gage positions are fixed. This is due to the fact that the necessary trigonometric functions which must be solved become fixed values and standard reference directions may be chosen. Several strain gage configurations or rosettes have therefore been developed, the most common of which are the rectangular and delta geometries.

Although the use of these standard rosette configurations simplify the equations relating the set of strain values to the state of stress, a good deal of arithmetic manipulation nevertheless is required to solve for the principal stresses, $\delta_1$ and $\delta_2$, for example, and the angle $\phi$, the angle between the reference direction and the direction of the algebraically larger principal stress.

The development of the rosette equations is based on the following relations between the principal stresses $\delta_1$ and $\delta_2$ and the principal strains $\epsilon_1$ and $\epsilon_2$ for an isotropic, elastic medium subject to conditions of plane stress:

$$\delta_1 = E/(1-v^2)(\epsilon_1 + \epsilon_2) \tag{1}$$

and $$\delta_2 = E/(1-v^2)(v\epsilon_1 + \epsilon_2) \tag{2}$$

where $\epsilon$ is the modulus of elasticity and $v$ is Poisson's ratio.

Also used in the development of these equations are the tensor transformation equations relating the principal strains to strains measured with respect to a given set of directions, such as the axial directions $a$, $b$, $c$ of the three strain gages that form the delta rosette.

There are certain combinations of components of the strain tensor which arise quite often and are accordingly given special names. For example, the hydrostatic strain component $$\epsilon_H = (\epsilon_1 + \epsilon_2)/2 \ (\epsilon_a + \epsilon_b + \epsilon_c)/3 \tag{3}$$

This component corresponds to the abscissa of the center of the Mohr's circle of strain. The radius of this circle is one-half the maximum value of the shear strain and corresponds to $$(\gamma \max)/2 = (\epsilon_1 + \epsilon_2)/2 \tag{4}$$

As an example of the complexity of the rosette equation for the delta rosette, one may consider the following relationship:

$$\sigma_1'\sigma_2 = \frac{E}{1-v}\frac{\epsilon_a + \epsilon_b + \epsilon_c}{3}$$

$$\pm \frac{E}{1+v}\sqrt{\left(\epsilon_a - \frac{\epsilon_a + \epsilon_b + \epsilon_c}{3}\right)^2 + \left(\frac{\epsilon_c - \epsilon_b}{\sqrt{3}}\right)^2} \tag{5}$$

where $+$ is used for $\sigma_1'$ and $$\tan 2\Phi = \frac{\sqrt{3}(\epsilon_c - \epsilon_b)}{2\epsilon_a - \epsilon_b - \epsilon_c}. \tag{6}$$

Various methods have been devised in the past to reduce the computational effort required to solve the various rosette equations. They include grapho-analytic techniques, nomographs, electrical rosette computers, mechanical and electro-mechanical computers.

While the graphical and nomographic methods do alleviate some of the tedious calculations involved, unfortunately, these methods are still time consuming and introduce such associated problems as scale error and interpolation error. The mechanical and electro-mechanical devices suffer from the usual problems associated with such mechanisms, such as mechanical backlash, mechanical complexity, and the fact that data has to be manually introduced into the apparatus. Additionally, they are inherently complex, bulky and large, requiring highly skilled personnel for their construction, operation and maintenance. By the same token, prior art electrical and electronic computers which have been devised to solve the general equations suffer from circuit complexity and also need relatively large transformers and power supplies which make their miniaturization difficult.

Instead of solving the rosette equations, the state of stress may be ascertained by utilizing the Mohr's circle representations of the states of stress and strain. A computer which accepts normal strain data from a four-gage rectangular rosette and solves the Mohr's circle of stress is described in the article, "Geometry in the Design of Stress Measuring Circuits; Improved Methods Through Simple Concepts," by Sidney B. Williams in the "S.E.S.A. Proceedings," Volume XVII, No. 2, published in 1960. The concept developed in this article utilizes the geometric relations between the Mohr's circle of strain and the associated Mohr's circle of stress as well as an analog between voltage and scalar methods in Mohr's space. However, this computer is restricted to the four-gage rectangular rosette which is not the most common configuration and which is not a standard production rosette.

A primary object of the present invention is to provide an analog computer which converts delta rosette strain data to state of stress information.

A secondary object of the present invention is to provide an analog computer for use with strain data from a delta rosette for determining the corresponding normal stress and shear stress conditions associated with any particular direction.

Another object of the present invention is to provide an analog computer which operates with strain data from a delta rosette and develops output signals which may be utilized to display the corresponding Mohr's circle of stress.

Another object of the present invention is to provide an analog computer for use with a delta rosette which may be utilized with materials having different Poisson's ratios.

Other objects, advantages and novel features of the invention will become apparent from the following detailed description of the invention when considered in conjunction with the accompanying drawings wherein.

Figure 1:
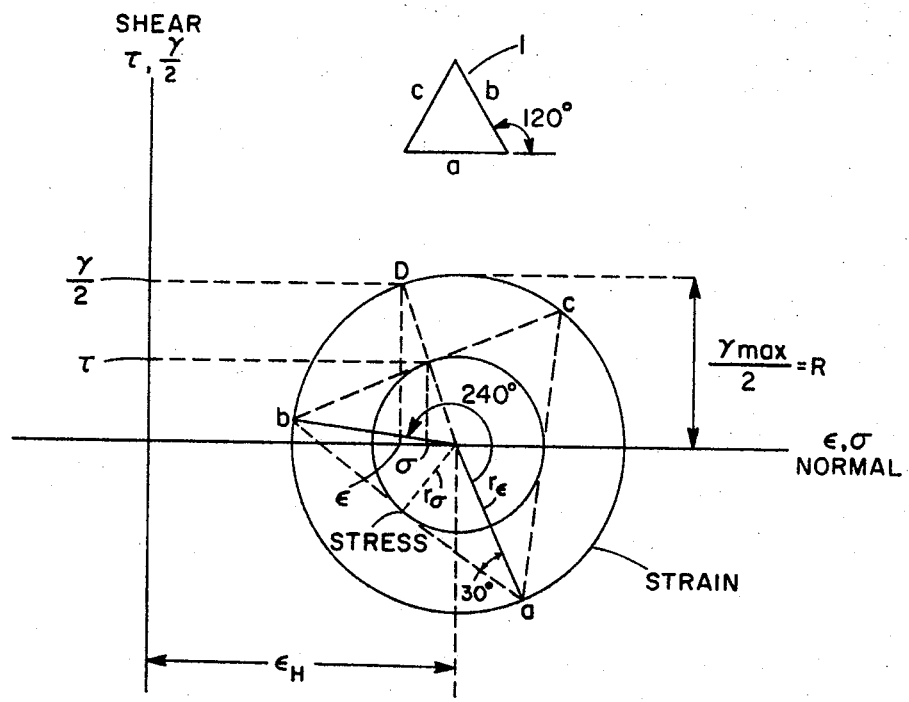
FIG. 1 illustrates typical Mohr circles of stress and strain.

Since the analog computer of the present invention is based on the geometry of the Mohr's circle diagrams for stress and strain, it is believed appropriate at this time to briefly describe these circles and their parameters. Referring now to FIG. 1, which shows these circles of strain and nondimensional stress for a rosette of three gages arranged in the delta configuration 1, it will be seen that the horizontal axis N is the normal axis while the vertical axis S is in the shear axis. The center of the strain circle is at the arithmetic mean of the principal strains $(\epsilon_1 + \epsilon_2)/2$, and the center of the stress circle is likewise located at the arithmetic mean of the principal stresses $(\delta_1 + \delta_2)/2$. The diameters of these circles are equal to the differences of principal stresses and strains, respectively. All stresses represented in the combined Mohr's circles have been nondimensionalized by dividing physical stresses by the factor $(E/(1-v))$.

The angular scale of these circles is twice that of the physical state.

The relationship between the normal stress scale and the normal strain scale is selected so as to have the hydrostatic strain component and the hydrostatic stress component of equal value. This results in the strain and stress circles being concentric, a condition which is desirable in translating the geometry of the Mohr's circles into an analogous electrical network with ground potential representing the origin. Thus, the normal stress physical scale is $E/(1-v)$ times the normal strain scale, and the radius of the non-dimensional stress circle is $(1-v/1+v)$ times the radius of the strain circle.

The normal strains $\epsilon_a$, $\epsilon_b$ and $\epsilon_c$ in the gage directions of the delta rosette 1 shown in this figure correspond to points A, B, C on the strain circle. It should be recognized that the normal strains are the projections from these points on the normal axis, and that the shear strains correspond to the projections on the shear axis. Points on the stress circle can also be resolved into their normal and associated shear stress components.

Again referring to FIG. 1, if secants are drawn between adjacent point a, b and c, the points representing the strains corresponding to the three sequential directions of the delta rosette, then the distance between two points on any of these lines is proportional to the distance along the abscissa between the projection of these points upon the N axis. Thus, if a linearly disposed resistor is connected between two terminals whose voltages with respect to a common reference potential are proportional to the normal strains corresponding to the directions of the associated strain gages, then the voltage at any point along that resistor with respect to the reference potential is proportional to the normal strain indicated by the projection of a corresponding point of the secant upon the abscissa. This is an application of Ohm's law. It follows from this that if three voltages representing the normal strain components of a delta rosette are connected by three continuous, linearly disposed resistors in the form of a resistance triangle, then the voltage at any point along a resistor represents the normal strain associated with the corresponding point of the triangle inscribed within the Mohr's circle of strain between the strain point S for the gage directions.

It can be shown that if the concentric stress circle lies entirely within the inscribed equilateral triangle, then voltage which are proportional to the normal stress components of points on the stress circle can be developed by suitably connecting voltage dividers to the resistance triangle.

According to the present invention, a linearly disposed circular potentiometer is connected to the resistance triangle described above such that the voltage between a point on this resistance circle and the reference potential is directly proportional to the normal stress component of the corresponding point of the Mohr circle of stress. Also, the voltage between another point 90° away and a potential representing the hydrostatic strain is proportional to the associated shear stress. This is the general basis for the analog computer of the present invention.

Figure 2:
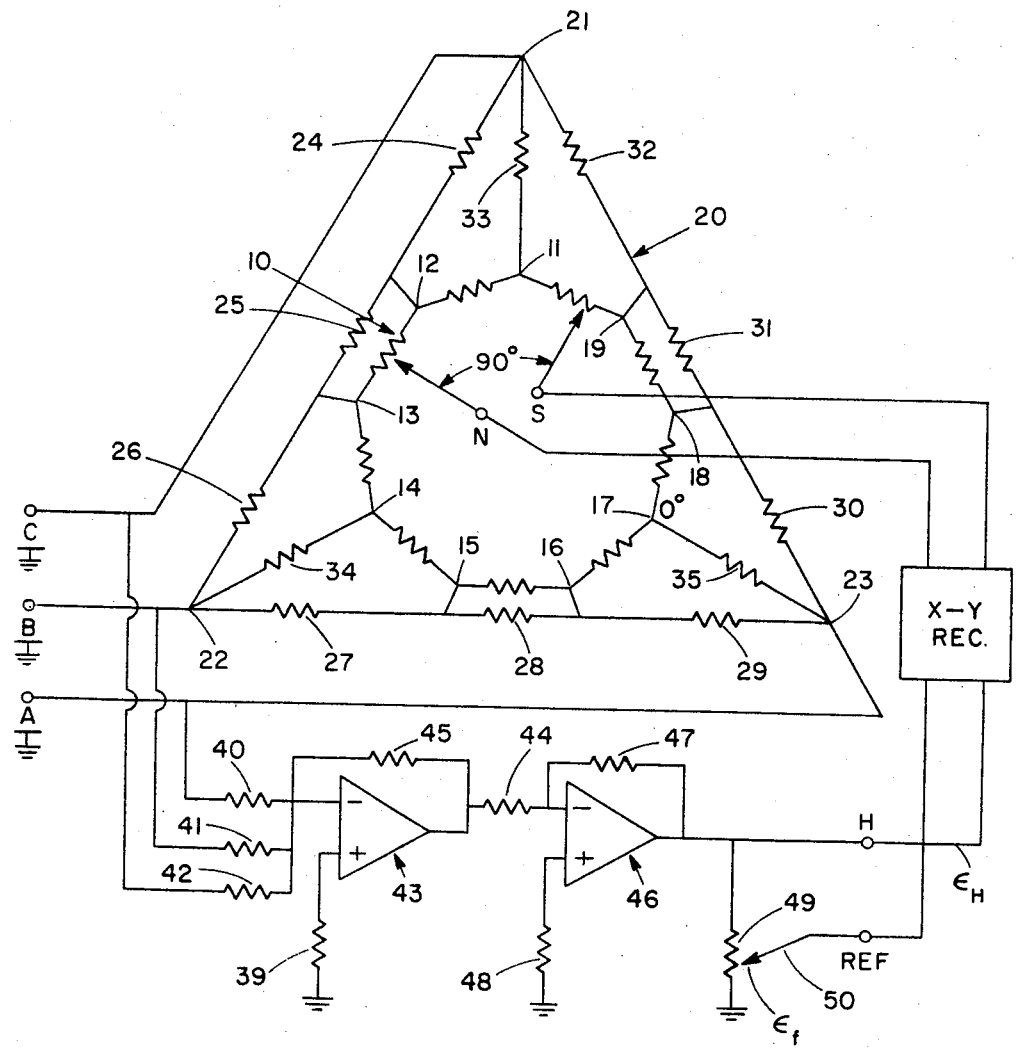
FIG. 2 is a schematic diagram of the analog computer.

Referring now to FIG. 2 of the drawings, which is a schematic diagram of the analog computer, it will be seen that the circuit consists of a linear circular potentiometer 10 which is formed with nine equally spaced taps 11, 12, 13, 14, 15, 16, 17, 18 and 19 which, in effect, transform the circular geometry of the potentiometer into a nonagon. This nonagon is the electrical equivalent of the Mohr circle of stress within an acceptable error. To preserve the relationship graphically depicted in FIG. 1, an equilateral resistance triangle 20 is disposed about this nonagon with the vertices thereof, 21, 22 and 23, corresponding to the points a, b, c on the strain circle.

The output of the individual strain gages of the delta rosette are connected to these points so that the voltages with respect to ground which energize this triangle are proportional to the normal strains acting on the corresponding gages. Because the three voltages involved may be applied to the vertices in three different sequences, such as abc, bca or cab, the system must possess symmetry to take care of this possibility. Thus, each triangular leg contains the same arrangement of resistances and is interconnected to the nonagon in a similar manner. Between vertices 21 and 22, there is the series combination of the three resistances 24, 25 and 26; between vertices 22 and 23, resistances 27, 28, 29; and between vertices 23 and 21, resistances 30, 31 and 32.

In order to impart further symmetry to the over-all network, resistors 24 and 26, resistors 27 and 29, and resistors 30 and 32 are all equal. Likewise, resistors 25, 28 and 31 are equal.

The vertices 21, 22, 23 of triangle 20 are connected to tapes 11, 14 and 17, which are symmetrically spaced 120° apart, by corner resistors 33, 34, 35 of equal value. Direct connections are made from the other taps to the juncture points of the resistors in the various legs of the triangle. Thus, there is a direct connection between tape 12 and the juncture of resistors 24, 25, and between taps 13, 15, 16, 18 and 19 and the junctures of resistors 25, 26; 27, 28; 28,29; 30, 31; and 31,32.

Two movable contacts, N and S, which are 90° apart physically, are the output elements of potentiometer 10. Contact N measures the normal stress voltage, while contact S measures the associated shear stress voltage.

Figure 3:
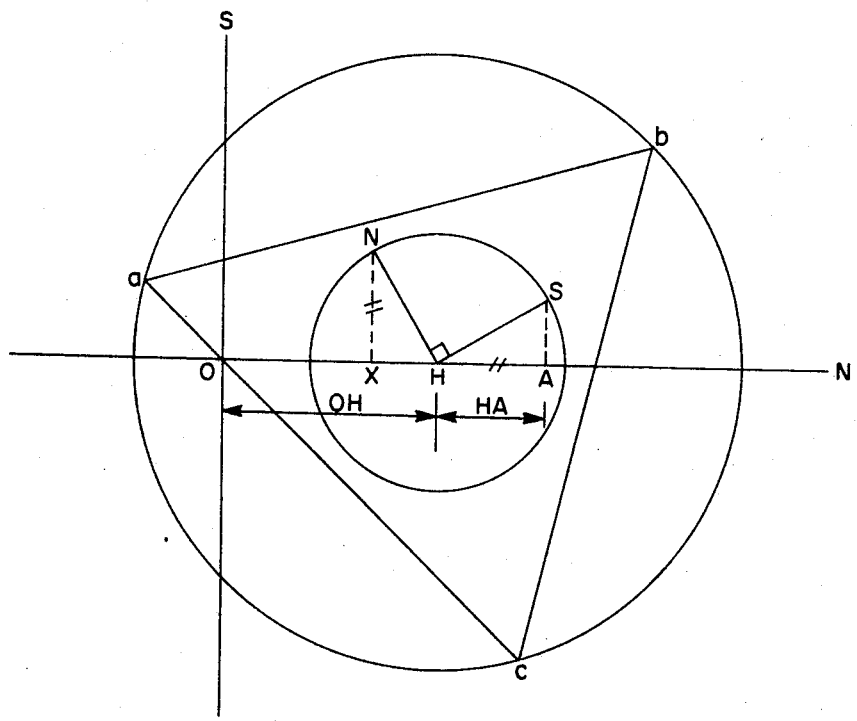

Turning now to FIG. 3, which shows a representative Mohr circle of strain and the associated non-dimensionalized Mohr circle of stress, it will be seen that an arbitrary point N, which corresponds to the angular setting of the N contact, has a normal stress component OX and a shear component NX. A voltage proportional to the OX component is therefore available at contact N as measured with respect to ground.

However, to obtain the shear component NX, a second contact S, spaced 90° from the N brush, is necessary. If one examines the triangles NXH and HSA, one will find that they are similar so that the distance NX equals the distance HA. Since the voltage at contact S with respect to ground corresponds to the dimension OA, OH must be subtracted therefrom to obtain HA, the shear component of point N. Point OH, it will be recalled, which locates the center of these Mohr circles, is the hydrostatic strain $\epsilon_h$ and, consequently, if the voltage at contact S is taken with respect to a level corresponding to this hydrostatic strain, the shear stress value will be obtained.

Referring now to FIG. 2 which shows the circuit utilized to obtain voltage $\epsilon_h$, it will be seen that the output voltages from the individual strain gages of the delta rosette are not only coupled to the vertices of triangle 20 but, also, to the negative input terminal of a first operational amplifier 43, by suitable resistors 40, 41 and 42. This amplifier, which is of conventional design, has an output resistor 44, a feedback resistor 45 and a balancing resistor 39 connected between its positive terminal and ground. Directly coupled to this amplifier is a second similar amplifier 46 which is included in the system for phase inversion purposes and it, too, has a feedback resistor 47 and a resistor 48 connected between its positive terminal and ground. The output of the over-all cascaded amplifier circuit appears at terminal H, and this output, as is well known, can be made to equal one-third the sum of the individual input signals by an appropriate selection of the values of the operating parameters of the system. Thus, at the above terminal a voltage proportional to the hydrostatic strain is available and, consequently, the shear stress may be obtained between contact S and this terminal.

Figure 4:
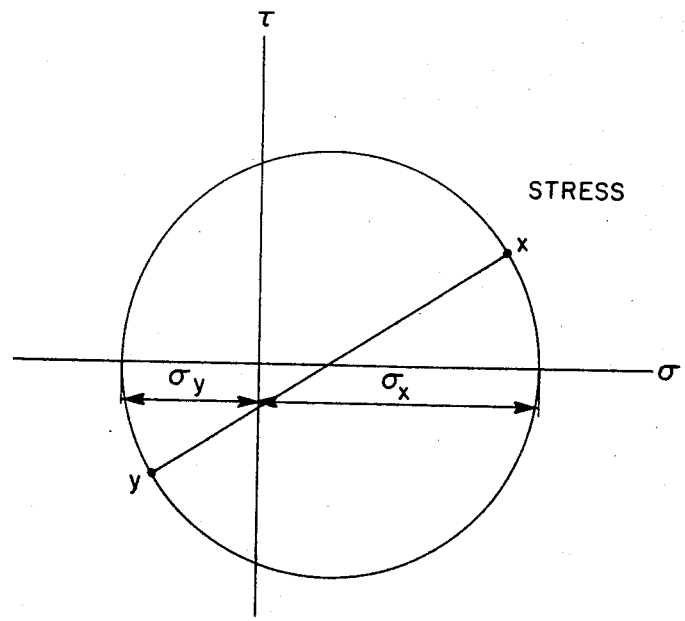

With a Poisson's ratio greater than one-third, the voltages appearing between contact N and ground and contact S and point H in FIG. 2 may be fed directly to an X-Y recorder which would automatically reproduce the Mohr stress circle as both of the above contacts are rotated. FIG. 4 illustrates the resultant circle. However, it should be recognized that since the electrical potentiometer 10 is, in fact, a nonagon, the X-Y recorder would not trace out the circle shown in FIG. 4 but, rather, a nonagon, and the principal stresses could be ascertained where this nonagon intersects the normal axis. It would also be pointed out at this time that these stresses could be obtained by utilizing only the contact N in the computer and rotating this contact until a maximum value was observed; this value and the one 180° away would, by definition, correspond to the principal stresses sought. The additional contact S allows the output of the computer to be directly fed to the X-Y recorder or oscilloscope for directly plotting and displaying this information.

The concentric relationship between the Mohr strain and stress circles imposes the requirement that the ratio of the radius of the non-dimensionalized stress circle to that of the strain circle be $1-v/(1+v)$. If one examines FIG. 1, it will be seen that the radius of the maximum size stress circle that fits within the equilateral triangle inscribed in the strain circle must be one-half the radius of the strain circle. Thus $(r_\sigma / r_\epsilon)$ cannot exceed ½ and $1-v/1+v$ cannot be $\geq$ ½. This relationship is satisfied when the Poisson's ratio $v \geq$ ⅓. Thus, the shear and normal stresses measured in the manner described above are correct only for the particular range of Poisson's ratio just noted.

When the Poisson's ratio is $\leq$ ⅓, the geometry of FIG. 1, for example, no longer holds true. And, as shown in FIG. 4, the stress circle 60 does not have a concentric relationship with the strain circle and its size is too large to fit within a triangle inscribed within this strain circle. Hence, the geometrical electric analog relationship shown in FIG. 2 is no longer valid and the computer must be modified to correct this error. Stated somewhat differently, the electrical network of FIG. 2, since it is permanently connected, cannot be altered to respond to the new location and size of the stress circle, and the measurements previously made with respect to ground and point H no longer represent the values of the normal and shear strains being measured by the delta rosette.

Figure 5:
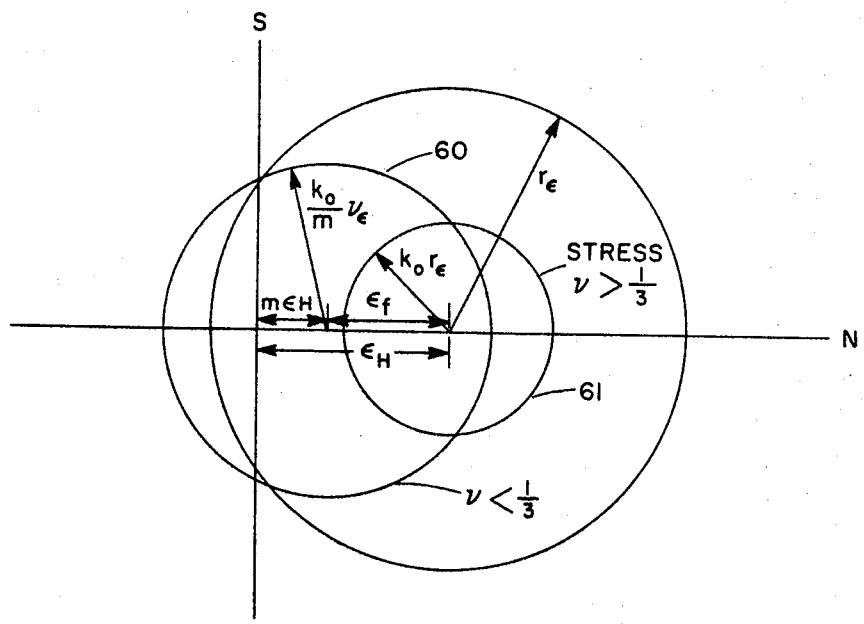
FIGS. 3, 4 and 5 are additional Mohr circles of stress and strain helpful in understanding the operation of the present invention.

The size of the voltage stress circle relative to the size of the voltage strain circle is set once the design value $k_o$ is chosen, as noted hereinbefore, and, as shown in FIG. 5, circle 61 represents the condition where the Poisson's ratio for the design circuit is greater than one-third. If the material under test has a Poisson's ratio $v$, which is less than one-third, then stress circle 60 results and the scale factor $E/1-v)$ must be changed. If $m = k_o/k$, where $k = 1-v/1+v$, then it can be shown that the normal stress voltage developed by the resistance stress circle of FIG. 2 must be corrected by subtracting therefrom a voltage corresponding to the quantity $$\epsilon_f = [(1-m)(\epsilon_1+\epsilon_2)/2]$$

(7)

The physical values of normal and shear stress are found through the use now of a scale factor $E/[m(1-v)]$ instead of $E/(1-v)$. For a delta rosette $$\epsilon_H = \epsilon_1+\epsilon_2/2 = \epsilon_a+\epsilon_b+\epsilon_c/3$$

(8)

Therefore, $$\epsilon_f = (1-m)(\epsilon_a+\epsilon_b+\epsilon_c)/3 = (1-m) \cdot \epsilon_H$$

(9)

This quantity can be subtracted from $\delta_x$ in the computer simply by measuring the x-direction stress circle voltage with respect to this $\epsilon_f$ voltage instead of with respect to ground. Thus, in the circuit of FIG. 2, a potentiometer 49 is connected between point H and ground, and its moving tap 50 provides the terminal at which the normal stress is taken with respect to the contact N. The factor $(1-m)$ is developed by use of this voltage divider, and the position of the tap is adjusted until the voltage at REF measured with respect to ground is $(1-m) \cdot (\epsilon_a + \epsilon_b + \epsilon_c)/3$. For a given design value of Poisson's ratio, the setting of potentiometer 49 can be calibrated in terms of Poisson's ratio. The shear stress is still taken with respect to point H since the new scale factor takes into account the change in radius of circle 60.

To present the Mohr stress and strain circle on a common scale, as noted hereinbefore, the stresses were divided by the factor $E/(1-v)$. This scale factor equalizes the hydrostatic stress and strain components and make the circles concentric. For the situation wherein values of Poisson's ratio other than the design value is to be used, the proper factor is then $E/[m(1-v)]$, where, as defined above, $m = (k_o/k)$.

In constructing the circuit of FIG. 2, one may select an arbitrary Poisson's design ratio $v_o$ between, for example, one-third and one-half, the maximum possible value. Thereafter, the algebraic solution for the various resistance relationships in the circuit of FIG. 2 may be simplified by use of normalizations with all resistances divided by the resistance of one section of the circular potentiometer as determined before this winding is closed on itself to form the circular loop. Additionally, for further simplification, the individual resistance values are solved in terms of the constant $k_o$, which is the ratio between the non-dimensionalized stress circle radius and the strain circle radius, that is, $k_o = (1-v_o/1+v_o)$. It can be shown that the various corner resistors 33, 34, 35, $r_c = [2.15147(1-k_o)]/k_o$, that the resistors 24, 26, 27, 29, 30 32, $r_o = (1.13725 - 2.13725 \times k_o)/k_o$, and that resistors 25, 28, 31, the middle resistors, $r_m = 1.3725 - 2.13725 \times k_o$.

SUMMARY OF THE INVENTION

The analog computer of the present invention consists of a circular resistance potentiometer which has taps that subdivide it into nine equal resistance sections and a resistance triangle which has three series connected resistors in each leg thereof. The potentiometer and triangle are interconnected such that each successive resistance section of said circle, as measured from a first starting tap and proceeding around said circle in a given direction, is in parallel with each corresponding successive resistor of said triangle, as measured from a first starting vertex of said triangle and proceeding around the three legs thereof in the same direction. This arrangement is the electrical analog of a Mohr circle of stress inscribed within an equilateral triangle which, in turn, is inscribed in a concentric Mohr circle of strain, with the three legs of the triangle corresponding to the three strain gages directions of the delta rosette configuration. The triangle is energized from the signal voltages from the delta rosette strain gages and the normal and associated shear stresses are obtained between two brushes of the circular potentiometer which are 90° apart and two potential levels $\epsilon_H$ and $\epsilon_f$ which are defined in the specification. The physical values of these stresses may be determined by multiplying these quantities by the scale factor $E/[m(1-v)]$, also defined.

What is claimed is:

1. An analog computer for solving for the normal and the associated shear stress values from the three signal voltages developed by strain gages arranged in the delta rosette geometry comprising, in combination, a circular resistance potentiometer having two rotatable brushes which are spatially disposed at right angles to each other so as to contact points on said potentiometer which are 90° apart, said potentiometer being provided with equally spaced taps which subdivide said potentiometer into nine equal resistance sections;

a resistance triangle having three series connected resistors in each leg thereof;

means for interconnecting said circular resistance potentiometer and said resistance triangle such that each successive resistance section of said circle as measured from a first starting tap and proceeding around said circle in a given direction is in parllel with each corresponding successive resistor of said triangle as measured from a first starting vertex of said triangle and proceeding around the three legs thereof in the same direction;

means for applying a different one of said signal voltages to each vertex of said resistance triangle;

means for developing from said three signal voltages a hydrostatic strain potential level $\epsilon_H$ corresponding to the average magnitude of said three signal voltages and a potential level $\epsilon_f$ corresponding to $(1-v) \cdot \epsilon_H$, where $$m = \frac{\dfrac{1-v_o}{1+v_o}}{\dfrac{1-v}{1+v}}$$

and where $v_o$ equals a preselected design Poisson's ratio and $v$ equals the Poisson's ratio of the material on which said strain gages are mounted;

the voltage at one of the brushes of said circular potentiometer, when taken with respect to $\epsilon_f$, being indicative of the normal stress; and the voltage at the other brush of said circular potentiometer, when taken with respect to said hydrostatic strain potential level $\epsilon_H$, being indicative of the associated shear stress.

2. In an arrangement as defined in claim 1, wherein said means for interconnecting said circular resistance potentiometer and said resistance triangle includes a corner resistor connected between each vertex of said trigangle and three taps on said circular potentiometer which are 120° apart.

3. In an arrangement as defined in claim 2 wherein each corner resistor has a value when normalized by being divided by the open-circuit magnitude of a resistance section of said circular resistance potentiometer of $(2.15147(1-k_o)/k_o$, where $k_o$ equals $(1-v_o/1+v_o)$ and where $v_o$ equals a preselected Poisson's design ratio.

4. In an arrangement as defined in claim 2 wherein said means for interconnecting said circular resistance potentiometer and said resistance triangle also includes direct connections between the other taps of said circular potentiometer and the junctions of the various resistors in the individual legs of said triangle.

5. In an arrangement as defined in claim 1 wherein all of the resistors of said resistance triangle which have one side thereof connected to a vertex of said triangle are of equal magnitude; and
all of the other middle resistors of each leg are also of equal magnitude.

6. In an arrangement as defined in claim 1 wherein all of said resistors that have one side connected to a vertex of said resistance triangle have a value when normalized by being divided by the open-circuit magnitude of a resistance section of said circular resistance potentiometer of $(1.13725 - 2.13725 k_o/k_o)$. where $k_o$ equals $(1-v_o/1+v_o)$ and where $v_o$ equals a preselected Poisson's design ratio.

7. In an arrangement as defined in claim 1 wherein all of said middle resistors of each leg have a value when normalized by being divided by the open-circuit magnitude of a resistance section of said circular resistance potentiometer of $1.13725 - 2.13725 k_o$, where $k_o$ equals $(1-v_o/1+v_o)$ and where $v_o$ equals a preselected Poisson's design ratio.

8. In an arrangement as defined in claim 1, an X-Y recorder; and
means for coupling to the "Y" terminals of said recorder the voltage appearing across one of the brushes of said circular potentiometer and $\epsilon_f$ and the "X" terminals the voltage appearing across the other brush of said circular potentiometer and $\epsilon_H$, whereby as said brushes are rotated a Mohr stress circle is reproduced on said recorder.

9. An analog computer for processing the three signal voltages produced by a delta rosette configuration of strain gages so as to obtain an indication of the principal stresses in the material under test, comprising
a circular resistance potentiometer having equally spaced taps which subdivide said potentiometer into nine equal resistance sections;
a resistance triangle having three series connected resistors forming each leg thereof;
means for interconnecting said circular resistance potentiometer and said resistance triangle such that each successive resistance section of said circle as measured from a first starting tap and proceeding around said circle in a given direction is in parallel with each corresponding successive resistor of said triangle as measured from a first starting vertex of said triangle and proceeding around the three legs thereof in the same direction;
means for energizing said resistance triangle by applying one of said signal voltages to each vertex of said triangle;
means for developing from said three signal voltages a potential level $\epsilon_f$ corresponding to $(1 - m) \cdot \epsilon_H$, where $\epsilon_H$ equals the average magnitude of said three signal voltages; and where $m$ equals $$\frac{\frac{1-v_o}{1+v_o}}{\frac{1-v}{1+v}}$$

where $v_o$ equals a preselected design Poisson's ratio and $v$ equals the Poisson's ratio of the mattrial under test,
the maximum voltage appearing between a first rotatable brush of said circular potentiometer and said potential level $\epsilon_f$ being indicative of the magnitude of one principle stress, and
the voltage appearing between said brush and said potential level $\epsilon_f$, when said brush is thereafter rotated 180° from the above position, being indicative of the magnitude of the other principle stress.

10. In an arrangement as defined in claim 9,
wherein said means for developing said potential level $\epsilon_f$ includes means for producing the potential level $\epsilon_H$; and
wherein said circular resistance potentiometer has a second rotatable brush spatially disposed at right angles to said first brush so that both brushes contact points on said potentiometer which are 90° apart.

11. In an arrangement as defined in claim 10,
an X-Y display device; and
means for coupling the voltage appearing between one of said brushes and the potential level $\epsilon_f$ to the Y deflecting terminals and the voltage appearing between the other brush and the potential level $\epsilon_H$ to the X deflecting terminals of said display device, whereby as said brushes are rotated a Mohr circle of stress is produced by said display device.

12. In an arrangement as defined in claim 9 wherein said means for interconnecting said circular resistor potentiometer and said resistance triangle includes
equal magnitude resistors joining the three vertices of said triangle to three taps of said circular potentiometer which are 120° apart.

13. In an arrangement as defined in claim 12 wherein all of the six resistors of said resistance triangle which have one side thereof connected to a vertex of said triangle have equal magnitudes; and
the three other resistors of said triangle also have equal magnitudes.

14. In an arrangement as defined in claim 9 wherein said means for developing said potential level $\epsilon_f$ includes
an output potentiometer connected between a potential corresponding to $\epsilon_H$ which is equal to the average magnitude of said three signal voltages; and
a reference potential, with the movable tap of this output potentiometer being the location whereat said potential $\epsilon_f$ with respect to said reference potential occurs.

15. An analog computer for solving the delta rosette strain gage equations comprising, in combination,
a circular resistance potentiometer having two rotatable brushes which are arranged to contact points on said potentiometer which are 90° apart;
a resistance triangle;
means for interconnecting said circular potentiometer and said resistance triangle such that they form an electrical analog of a Mohr circle of stress inscribed within an equilateral triangle that is inscribed within a concentric Mohr circle of strain;
means for energizing said resistance triangle with the three signal voltages obtained from a delta rosette configuration of strain gages;

means for developing a potential level $\epsilon_H$ equal to the average value of said three signal voltages; and an output potentiometer connected between said potential level $\epsilon_H$ and a reference potential level, the voltage between one of said brushes and potential level $\epsilon_H$ being indicative of the magnitude of the shear stress and the voltage between the other of said brushes and the movable tap of said output potentiometer being indicative of the magnitude of the normal stress.

* * * * *